US 6,726,754 B2

(12) United States Patent
Lye et al.

(10) Patent No.: US 6,726,754 B2
(45) Date of Patent: Apr. 27, 2004

(54) METHOD FOR ENZYME MEDIATED REMOVAL OF GAS FROM INKS, AND REDUCED GAS INKS

(75) Inventors: Jason Lye, Atlanta, GA (US); Teri Taylor Kish, Roswell, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/243,233

(22) Filed: Sep. 13, 2002

(65) Prior Publication Data
US 2004/0055505 A1 Mar. 25, 2004

(51) Int. Cl.[7] .................... C09D 11/00; G01D 11/00
(52) U.S. Cl. ............... 106/31.27; 106/31.6; 106/31.58; 106/31.86; 106/31.43; 106/31.75; 347/100
(58) Field of Search ............. 106/31.27, 31.6, 106/31.58, 31.86, 31.43, 31.75; 347/100

(56) References Cited

U.S. PATENT DOCUMENTS

| 4,526,773 A | | 7/1985 | Weber |
| 4,948,427 A | | 8/1990 | Tamagishi et al. |
| 5,270,337 A | | 12/1993 | Graf |
| 5,284,871 A | | 2/1994 | Graf |
| 5,654,164 A | | 8/1997 | Gardiol et al. |
| 5,700,315 A | * | 12/1997 | Wenzel .......... 106/31.58 |
| 5,804,401 A | | 9/1998 | Gardiol et al. |
| 5,871,572 A | * | 2/1999 | Marritt .......... 106/31.36 |
| 6,086,660 A | * | 7/2000 | Mukaiyama et al. .... 106/31.43 |

FOREIGN PATENT DOCUMENTS

| DE | 3335614 | 4/1985 |
| JP | 55-017571 | 2/1980 |
| JP | 56-030869 | 3/1981 |
| JP | 58-191167 | 11/1983 |
| JP | 60-021255 | 2/1985 |
| JP | 63-147652 | 6/1988 |
| JP | 02-290201 | 11/1990 |
| JP | 04-147863 | 5/1992 |
| JP | 05-017712 | 1/1993 |
| JP | 05-320549 | 12/1993 |
| JP | 09-031378 | 2/1997 |
| JP | 10-060339 | 3/1998 |
| JP | 10-202910 | 8/1998 |
| WO | WO 99/28411 | 6/1999 |
| WO | WO 02/31067 | 4/2002 |

OTHER PUBLICATIONS

J.G. Stark, Chemistry Data Book—Second Edition in SI, Aug. 1982, pp. 60–61.
Internet Web Site/http://www.worthington–biochem.com/manual/G/GOP.html Sep. 9, 2002.
L. Stryer, Biochemistry, Second Edition 1981, Chapter 6, Introduction to Enzymes, pp. 104–121, No month available.
Internet Web Site/http://www.chem.qmul.ac.uk/iubmb/enzyme/Nomenclature Committee of the International Union of Biochemistry and Molecular Biology, "Enzyme Nomenclature" Jul. 24, 2002.
Intenet Web Site/http://class.fst.ohio–state.edu/FST605/lectures/Lect13.html "Enzymatic Reactions" Aug. 2, 2002.

* cited by examiner

Primary Examiner—C. Melissa Koslow
Assistant Examiner—Veronica F. Faison
(74) Attorney, Agent, or Firm—Steven D. Flack

(57) ABSTRACT

A method for degassing ink, and resulting degassed ink includes the addition of at least two enzymes to ink containing a donor substrate specific to each enzyme, wherein one of the enzymes catalyzes a chemical reaction to produce hydrogen peroxide upon exposure to a gaseous acceptor substrate, and another enzyme subsequently catalyzes a reaction to convert the hydrogen peroxide into water.

33 Claims, 3 Drawing Sheets

METHOD FOR ENZYME MEDIATED REMOVAL OF GAS FROM INKS, AND REDUCED GAS INKS

FIELD OF THE INVENTION

The present invention relates generally to inks. More specifically, the present invention relates to methods of reducing gas in inks, and inks produced from such methods.

BACKGROUND OF THE INVENTION

Ink jet printing is a non-impact and non-contact printing method in which an electronic signal controls and directs droplets or a stream of ink, that can be deposited on a wide variety of substrates. Current ink jet printing technology involves forcing the ink drops through small nozzles by piezoelectric pressure, thermal ejection, or oscillation, and onto the surface of a material/media. Ink jet printing is extremely versatile in terms of the variety of substrates that can be treated, as well as the print quality and the speed of operation that can be achieved. In addition, ink jet printing is digitally controllable. For these reasons, ink jet methodology has been widely adopted for numerous industrial and personal applications. However, even given the recent rapid advancements in the ink jet printing field, "printability"/"runability" problems remain, that continue to plague the ink jet printer and ink markets.

For instance, it is widely known in the inkjet printing field that dissolved air in inks can cause runability problems for inkjet printers. Dissolved or colloidal air may form small bubbles within feed tubes in the printer print head, disrupting ink flow. Therefore, aqueous inkjet inks are usually subjected to some type of de-aeration process, whereby gases that are either dissolved in true solution, contained in the ink in colloidal form, or chemically adsorbed to particulate surfaces (e.g. pigment particles) are removed. Current methods of degassing inks include either subjecting the ink to a vacuum, or passing helium gas through the ink. As helium gas is less soluble than oxygen or nitrogen gas, these gases are carried out of the ink mixture.

However, even given the usage of such degassing methods, it is recognized that gases such as oxygen and nitrogen are able to diffuse through most polymers, the materials commonly used to store ink jet inks. Eventually, such gases will re-saturate inks stored in such polymeric containers. For instance, as can be seen in FIG. 1, which illustrates a cross section of an exemplary ink cartridge 10 for storing inks 12, even though the ink 12 is contained in a rigid casing 14 which includes a separate flexible bladder 16 that actually contains the ink 12, air may permeate the ink cartridge either from the air space 18 between the rigid casing and the bladder in the cartridge 10, or externally from the cartridge through the rigid casing 14, or the septum 20. The penetration of air is indicated in the Figure by dotted arrows, such as at 22.

Once the level of gases in inkjet inks reaches an appreciable level, runability issues, such as nozzle misfiring, may result. This is particularly apparent for piezo type inkjet print heads that include fine feed channels. Thus, natural diffusion of gases through the container itself may limit ink shelf-life.

The presence of air is particularly problematic in pigmented inks for several reasons. For instance, oxygen is more soluble in the surfactants that are used to stabilize pigment dispersions. Furthermore, the surfactants used can stabilize colloidal gas particles, and pigment dispersions have a large surface area for chemical adsorption of gases to take place.

Other types of ink may also be sensitive to dissolved gasses from the atmosphere. For instance, clear coating inks, glues, varnishes, and resin finishes may contain dissolved air, which, as the applied ink film dries, saturates the drying ink layer to form unsightly air bubbles that remain after the ink layer has dried.

Oxygen sensitivity is also an issue with regard to certain ultra-violet curable inks. Unless care is taken to exclude oxygen during the curing step (exposure to ultraviolet (UV) radiation) oxygen may inhibit the photocuring reaction, leading to tackiness of the final coating.

Therefore, there is a need in the art for inks that do not allow for the gases of air to build up in the ink mixture. There is also a need for methods of degassing inks prior to use. Finally, there is also a need for such inks and methods for use with inks, specifically for inkjet printing on textiles, and for inks utilizing pigments as coloring agents, for inks that are cured using ultraviolet light, and for inks that dry to give a clear finish, as well as any other oxygen or air sensitive ink.

SUMMARY OF THE INVENTION

A method for degassing ink includes the addition of at least one enzyme to ink containing a donor substrate, with the enzyme capable of catalyzing the production of a reaction product that is acceptable to an ink formulation, by using a donor substrate contained in the ink upon exposure to a gaseous acceptor substrate.

Alternatively, a method for degassing ink includes the addition of at least two enzymes to ink containing a donor substrate specific to each enzyme, wherein one of the enzymes catalyzes a chemical reaction to produce a first reaction product upon exposure to a gaseous acceptor substrate, and another enzyme subsequently catalyzes a reaction to convert the first reaction product into a second reaction product that is acceptable in an ink system.

Still further, another alternative method for degassing ink includes the addition of at least two enzymes to ink containing a donor substrate specific to each enzyme, wherein one of the enzymes catalyzes a chemical reaction to produce hydrogen peroxide upon exposure to a gaseous acceptor substrate, and another enzyme subsequently catalyzes a reaction to convert the hydrogen peroxide into water.

As another aspect of the invention an ink composition includes at least one enzyme, and a donor substrate specific to the enzyme, with the enzyme being capable of catalyzing the production of a reaction product that is acceptable to the ink formulation, by using the donor substrate contained in the ink, upon exposure to a gaseous acceptor substrate.

A further ink composition includes at least two enzymes and a donor substrate specific to each enzyme, wherein one of the enzymes is capable of catalyzing a chemical reaction to produce a first reaction product upon exposure to a gaseous acceptor substrate, and another enzyme is capable of subsequently catalyzing a reaction to convert the first reaction product into a second reaction product that is acceptable to the ink.

Still a further ink composition includes at least two enzymes and a donor substrate specific to each enzyme, wherein one of the enzymes is capable of catalyzing a chemical reaction to produce hydrogen peroxide upon exposure to a gaseous acceptor substrate, and another enzyme is capable of subsequently catalyzing a reaction to convert the hydrogen peroxide into water.

DEFINITIONS

Figure 1:
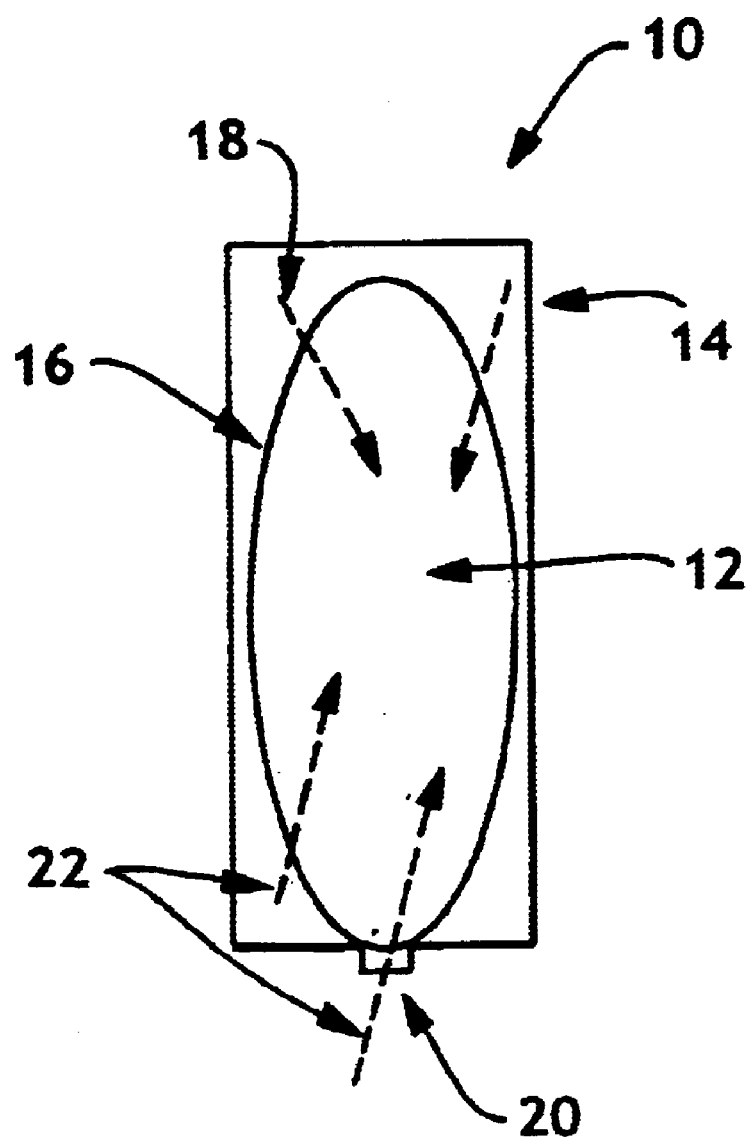
FIG. 1 illustrates a cross-sectional view of an exemplary printer cartridge.

Within the context of this specification, each term or phrase below will include the following meaning or meanings.

"Polymers" include, but are not limited to, homopolymers, copolymers, such as for example, block, graft, random and alternating copolymers, terpolymers, etc. and blends and modifications thereof. Furthermore, unless otherwise specifically limited, the term polymer shall include all possible geometrical configurations of the material. These configurations include, but are not limited to, isotactic, syndiotactic and atactic symmetries.

"Vehicle" refers to a substance, mixture or material in which an enzyme performs a function. The mixture, substance or material can be in the form of an end-use product or a work-in-process, such as an intermediary.

"Enzymes" refers to organic biological catalysts, typically comprising proteins, that facilitate reactions to proceed without extremes of temperature or pressure, and may be specific to certain reactants depending upon the type of enzyme. For the purposes of this application, the term enzyme shall be defined broadly to include any coenzyme that assists in the catalytic reaction, or enhances function of the enzyme.

"Coenzyme" refers to an organic or organometallic, usually non-peptide moiety integrated with an enzyme, that allows it to function or enhances function. Glucose oxidase, for instance, incorporates a flavine adenine dinucleotide (FAD) coenzyme that participates in the reaction:

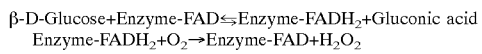

Enzyme-FADH$_2$+O$_2$→Enzyme-FAD+H$_2$O$_2$

Gluconic acid is also known as δ-D-gluconolactone. In the above reaction process, Glucose oxidase incorporates a flavine adenine dinucleotide (FAD) coenzyme that participates in the reaction as previously described. It can be seen from the coenzyme equations that 1 mole of glucose (180 g) will be needed to consume 1 mole oxygen (32 g). Since 1 mole of a gas occupies 22.41383 liters at 273.15K and 101325 N.m$^{-2}$, 1 g of glucose is enough to consume 124.52 cm$^3$ of oxygen.

"Substrates" refers to the reactant or reactants upon which an enzyme acts. Substrates may be specific to particular enzymes. Substrates bind with enzymes to form an intermediate enzyme-substrate complex. In this way, enzymes control the speed and specificity of biochemical reactions.

"Donor Substrate" refers to a reactant that becomes at least partially oxidized when acted upon by an enzyme. For example, when utilizing glucose oxidase enzyme, glucose would be an acceptable donor substrate (i.e., it is specific to the glucose oxidase enzyme) because glucose is oxidized to gluconic acid by oxygen in the presence of glucose oxidase.

"Acceptor Substrate" refers to a substrate that reacts in an enzyme mediated reaction to become at least partially reduced. For example, in the combination of glucose, oxygen, and glucose oxidase, oxygen would be considered an acceptor substrate because it is reduced to hydrogen peroxide.

"Biocide" refers to a substance that kills microbes or microorganisms.

"Biostat" refers to a substance that prevents microbes from multiplying/reproducing.

"Media" refers to a material that is to be printed with a liquid from an ink jet printer. Media includes, but is not limited to traditional print surfaces, such as cellulosic (paper-based) materials, woven and nonwoven materials, sheet materials such as metallic or polymeric materials, as well as nontraditional print surfaces, such as home and industrial furnishings.

"Aqueous" refers to a substance being made from, with, or by means of water.

"Stabilizer" refers to a substance or combination of substances that can preserve the activity of an enzyme over time under various conditions. There are inherent problems with enzyme compositions. For example, for purposes of this invention, it is desirable in some cases to have an aqueous enzyme composition. However, enzymes may be denatured in water over time, resulting in a loss of enzyme activity. Thus, in order to have an aqueous enzyme composition that is suitable for the invention, the enzyme is desirably stabilized so that it can retain its activity for long periods of time.

"Words of degree", such as "About", "Substantially", and the like are used herein in the sense of at, or nearly at, when given the manufacturing and material tolerances inherent in the stated circumstances and are used to prevent the unscrupulous infringer from unfairly taking advantage of the invention disclosure where exact or absolute figures are stated as an aid to understanding the invention.

"Comprising" is inclusive or open-ended and does not exclude additional unrecited elements, compositional components, or method steps.

These terms may be defined with additional language in the remaining portions of the specification.

DETAILED DESCRIPTION OF THE INVENTION

The present invention provides a method for removing gases (or degassing) from inks for inkjet printing applications. The method involves utilizing an ink in an inkjet printing operation that includes a formulation having at least the following components: 1) an ink; 2) at least one enzyme capable of catalyzing the production of a reaction product that is acceptable to an ink formulation, by using a donor substrate contained in the ink upon exposure to a gaseous acceptor substrate. By catalyzing the production of a reaction product that is acceptable to an ink formulation, the enzyme would essentially be converting a gas, which is unacceptable to desirably a liquid that would be acceptable. By "acceptable" is meant that the liquid (or reaction product) should not by itself be detrimental to the ink performance or result in additional printability/runability problems, and the reaction product produced by the catalytic reaction should be generally compatible with the ink. For instance, the reaction product should not cause significant adverse pH problems (a large increase or decrease in pH) that would prevent use of the ink as an ink, or result in the formation of unwanted particulates through precipitation that themselves cause ink head misfiring or cause corrosion issues on, for example, the ink jet printer, beyond those that are normally found in such inks without enzyme components (reaction products should be water soluble). For instance, depending on the type of ink, it may be desirable to maintain the pH of the ink between about 3 and 10, depending on the print head. Alternatively, it may be desirable to maintain the pH between about 5 and 9.

In an alternate embodiment, the present invention provides a method for degassing ink comprising the addition of at least two enzymes to ink containing a donor substrate specific to each enzyme, wherein one of the enzymes catalyzes a chemical reaction to produce a first reaction product upon exposure to a gaseous acceptor substrate, and another enzyme subsequently catalyzes a reaction to convert the first reaction product into a second reaction product that is acceptable in an ink system.

In a more specific embodiment the method involves utilizing an ink in an inkjet printing operation that includes a formulation having at least the following components: 1) an ink; 2) an enzyme capable of catalyzing the production of hydrogen peroxide from a donor substrate and oxygen; 3) an enzyme capable of catalyzing the conversion of hydrogen peroxide to water; and 4) a donor substrate specific to each particular enzyme. In another embodiment, the formulation further includes 5) a corresponding acceptor substrate for each enzyme mediated reaction carried out by the enzymes, the first enzyme substrate being a gas.

Inks produced for use in the methods and methods of producing such inks are also contemplated as being within the scope of the invention.

Inkjet inks are well known in the field of art and industry. Such "coloring" inks contemplated by the invention tend to be aqueous in nature, although the invention can apply to non-aqueous liquids under circumstances where the shape of the enzyme is preserved sufficiently to perform the desired function. For example, one such aqueous inkjet ink contemplated by the invention comprises a solvent vehicle (for example, composed principally of glycols, water and 2-pyrrolidone), a surfactant system (including dispersants, defoaming agents and surface tension agents), and a colorant system (either a dye or a pigment dispersion or a mixture of both). Example of colorant ink formulations that may be used with the invention include those coloring inks described in WO 02/31067 which is incorporated by reference herein in its entirety.

It should be recognized, that the term "inks" may alternatively encompass a chemistry system other than a traditional colorant system, that is not designed to impart color to a printable media, but is instead, designed to impart some other attribute to printable media via a delivery system, such as an ink jet printer. An example of such a chemical system may be a functional coating, such as a surfactant designed to make the printable media more hydrophilic, ink jettable UV curable coatings, ink jettable skin treatments and therapies, ink jettable diagnostic coatings such as for sensors, and ink jettable chemical resists and photoresists for electronic applications. The invention, while particularly appropriate for ink jet inks, is not limited to use with such inks, in that clearcoat varnishes, UV curable coatings, photoresists, gravure inks, lithographic inks, flexographic inks, bead coating inks, screen printing inks, spray coating inks, kiss coating inks, and paste inks may also benefit from gas removal. Such alternative chemical systems may also be combined together or with colorant systems, in order to deliver multiple functionality to media to be printed.

Generally speaking, enzymes are specific proteins that act as catalysts for certain chemical reactions. Most of these reactions would not otherwise proceed in a reasonable time without extreme temperature or pressure. Furthermore, enzymes are specific for the substrates upon which they act. The enzymes used in the invention catalyze reactions by facilitating oxidation of donor substrates while simultaneously facilitating reduction of acceptor substrates.

The invention contemplates enzymes that have the capability of producing hydrogen peroxide by catalyzing reactions within an ink containing a donor substrate specific to the particular enzyme and a corresponding acceptor substrate. One such class of enzymes contemplated by the invention, for example, is oxidase, which utilizes oxygen as an acceptor substrate. Examples of such enzymes include, but are not limited to, (S)-2-hydroxy-acid oxidase, malate oxidase, glucose oxidase, hexose oxidase, cholesterol oxidase, aryl-alcohol oxidase, L-gulonolactone oxidase, galactose oxidase, pyranose oxidase, L-sorbose oxidase, pyridoxine 4-oxidase, alcohol oxidase, (S)-2-hydroxy-acid oxidase, ecdysone oxidase, choline oxidase, secondary-alcohol oxidase, 4-hydroxymandelate oxidase, glycerol-3-phosphate oxidase, xanthine oxidase, thiamin oxidase, L-galactonolactone oxidase, cellobiose oxidase, hydroxyphytanate oxidase, N-acylhexosamine oxidase, polyvinyl-alcohol oxidase, methanol oxidase, D-arabinono-1,4-lactone oxidase, vanillyl-alcohol oxidase, nucleoside oxidase ($H_2O_2$-forming), D-mannitol oxidase, xanthine oxidase, pyruvate oxidase, oxalate oxidase, glyoxylate oxidase, pyruvate oxidase (CoA-acetylating), aryl-aldehyde oxidase, carbon-monoxide oxidase, retinal oxidase, dihydroorotate oxidase, lathosterol oxidase, acyl-CoA oxidase, dihydrouracil oxidase, and tetrahydroberberine oxidase. These enzymes are presented merely as examples and are not meant to be exhaustive or limiting in any manner. Oxidase enzymes may be used in inks in very small quantities, as they are catalytic, and are not themselves consumed in the reactions that they catalyze. For this reason, a level of about 0.0001% wt of an oxidase enzyme would be effective. In order to complete degassing faster, a higher level may be needed, such as about 0.1% by weight. Still further, the enzyme could be used at a level of about 1.0% wt.

The invention also contemplates use of enzymes that have the capability of converting hydrogen peroxide into water by catalyzing reactions within an ink containing a donor substrate specific to the particular enzyme and hydrogen peroxide as the acceptor substrate. One such enzyme contemplated by the invention, for example, is peroxidase, which utilizes hydrogen peroxide as an acceptor substrate. However, any enzyme that can catalyze a reaction to convert hydrogen peroxide into water would be acceptable. Examples of such enzymes that can convert peroxides include, but are not limited to, lactoperoxidase, bromoperoxidase and microperoxidase. These enzymes are presented merely as examples and are not meant to be exhaustive or limiting in any manner. Peroxidase enzymes may be used in inks in very small quantities, as they are catalytic, and are not themselves consumed in the reactions that they catalyze. For this reason, a level of 0.0001% wt of an oxidase enzyme would be effective. In order to complete degassing faster, a higher level may be needed, such as 0.1% by weight. Still further, the enzyme could be used at a level of 1.0% wt.

Donor substrates may be specific to each particular enzyme. For example, if glucose oxidase enzyme is selected, then glucose would be an acceptable donor substrate. In another example, if galactose oxidase enzyme is selected, then galactose would be an acceptable donor substrate. Thus, keeping in mind the aforementioned oxidase enzyme examples, the following respective donor substrates would be acceptable: (S)-2-hydroxy acid, (S)-malate, glucose, β-D-glucose, cholesterol, aromatic primary alcohols, L-gulono-1,4-lactone, D-galactose, D-glucose, L-sorbose, pyridoxine, primary alcohols, (S)-2-hydroxy acid, ecdysone, choline, secondary alcohols, (S)-2-hydroxy-2-(4-hydroxyphenyl) acetate, sn-glycerol 3-phosphate, xanthine, thiamine, L-galactono-1,4-lactone, cellobiose, L-2-hydroxyphytanate, N-acetyl-D-glucosamine, polyvinyl alcohol, methanol, D-arabinono-1,4-lactone, vanillyl alcohol, adenosine, mannitol, xanthine, pyruvate+phosphate, oxalate, glyoxylate, pyruvate+CoA, an aromatic aldehyde, carbon monoxide and water, retinal, (S)-dihydroorotate, 5α-cholest-7-en-3,β-ol, acyl-CoA, 5,6-dihydrouracil, and (S)-tetrahydroberberine. The above list is meant to be offered merely as examples and are not meant to be exhaustive or limiting in any manner. Sufficient donor substrate is added to inks to allow the enzymes contained therein to consume oxygen throughout the working life of the ink, or before it dries. Donor substrates may be incorporated into inks at levels between 0.1% to 90%. The upper limit to the amount of donor substrate that could be included in an ink depends upon the viscosity limitations of the ink, as well as other parameters. For instance, drop on demand ink jet ink heads are available that can fire ink at 12 cps.

Lithographic inks may have viscosities near 1000–10,000 cps. Gravure ink viscosities may vary, but may be in the range of 100–400cps. This gives a large range within which the donor substrate may be added to the ink.

In still another example, if a peroxidase enzyme is selected, then ascorbate would be an acceptable donor substrate. While the term ascorbate is utilized, such material can also encompass ascorbic acid or an ascorbate salt, such as for instance, including, but not limited to, an alkali metal ascorbate salt, a group II metal ascorbate salt, and a quarternary ammonium ascorbate salt. Other acceptable donor substrates for peroxidase enzymes include, but are not limited to, phenols, aromatic amines, pyrogallol, guaiacol, ferrocyanide, 4-aminoantipyrine and cyctochrome c. These donor substrates are all presented merely as examples and are not meant to be exhaustive or limiting in any manner.

The acceptor substrate of the invention is contemplated to include at least oxygen. Oxygen can be utilized in a number of forms, such as, for example, pure oxygen, oxygen mixed with other gases to form air, and oxygen dissolved in an ink. The acceptor substrate is not meant to be limited to these examples, but rather may encompass any molecule or form that can be used with a corresponding enzyme and donor substrate to generate hydrogen peroxide. Once the hydrogen peroxide has been generated, it becomes the acceptor substrate for the peroxidase enzyme mediated reaction.

Figure 2:
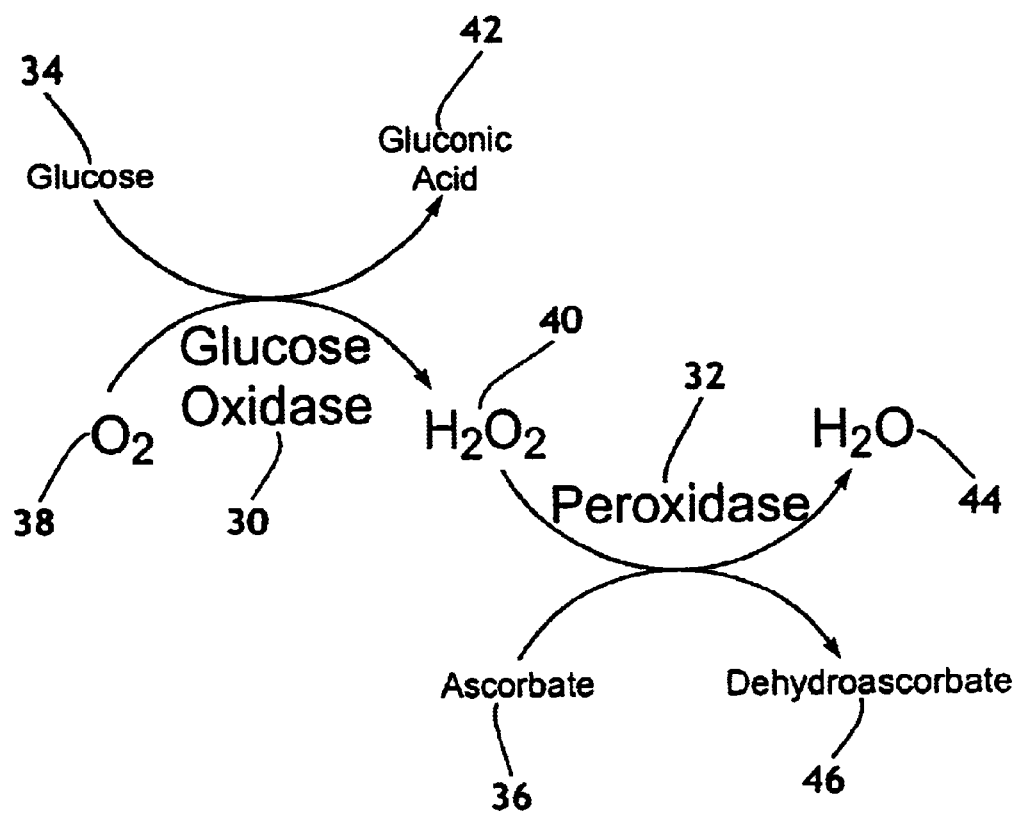
FIG. 2 illustrates a reaction utilizing an oxidase and peroxidase enzyme in accordance with the method of the present invention.

An aspect of the invention can be seen in FIG. 2 which illustrates a reaction showing consumption of aerial or dissolved oxygen. In a hypothetical example of an ink in accordance with the invention, an ink may contain glucose oxidase enzyme 30, peroxidase enzyme 32, glucose 34 and ascorbate 36. As illustrated by FIG. 2, when the ink containing these components is exposed to oxygen 38, the glucose oxidase enzyme 30 catalyzes a reaction between the glucose 34 and the oxygen 38 to form hydrogen peroxide 40, with gluconic acid 42 as a byproduct. The peroxidase enzyme 32 then catalyzes a reaction between the hydrogen peroxide 40 and the ascorbate 36 to produce water 44, with dehydroascorbate 46 as a byproduct. Here, the glucose 34 and the ascorbate 36 function as donor substrates, and the oxygen 38 and the hydrogen peroxide 40 function as acceptor substrates.

Figure 3:
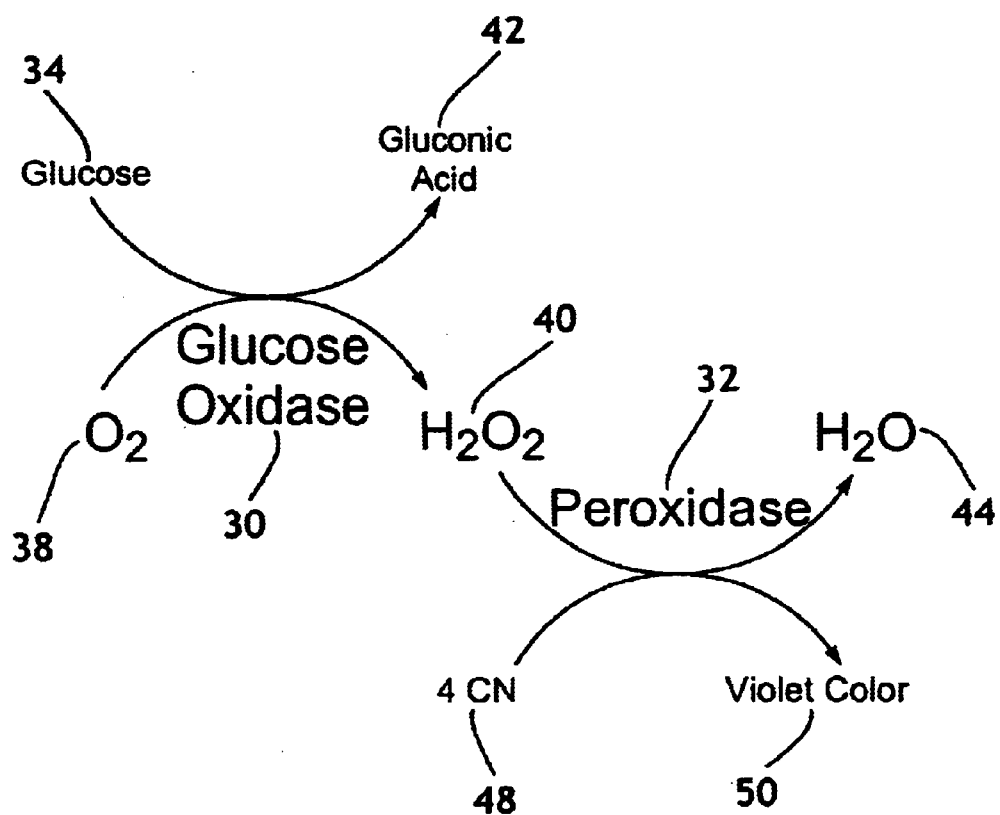
FIG. 3 illustrates a reaction utilizing an oxidase and peroxidase enzyme in accordance with the method of the present invention, along with a color indicator.

One further aspect of the invention can be seen in FIG. 3, which illustrates a reaction showing consumption of aerial or dissolved oxygen with a color indicator.

In this Figure, a hypothetical ink contains glucose oxidase enzyme 32, peroxidase enzyme 32, glucose 34 and 4-Chloro-1-Naphthol indicator 48. When the hypothetical ink is exposed to oxygen 38, the glucose oxidase enzyme 30 catalyzes a reaction between the glucose 34 and the oxygen 38 to form hydrogen peroxide 40, with gluconic acid 42 as a byproduct. The peroxidase enzyme 32 then catalyzes a reaction between the hydrogen peroxide 40 and the 4-Chloro-1-Naphthol indicator 48 to produce water 44 and a violet color 50. Here, the glucose 34 and the 4-Chloro-1-Naphthol indicator 48 (4CN) function as donor substrates, and the oxygen 38 and the hydrogen peroxide 40 function as acceptor substrates. The formation of the violet color 50 from the reaction with 4-Chloro-1-Naphthol 48 indicates that the intended objective of the invention indeed occurs. In this instance, a color indicator is utilized specifically to determine the end result.

It should be understood in the practice of the invention, that it may be desirable to remove gases other than oxygen. For example, like oxygen, nitrogen gas may be present in inkjet inks. To remove these other gases from the ink, additional enzymes can be utilized. For example, to remove nitrogen gas from the ink, nitrogenase enzyme could be utilized to reduce the nitrogen gas into ammonia or ammonium (dependent upon pH). Nitrogenase enzyme is presented merely as an example and is not meant to be exhaustive or limiting in any manner.

It is recognized in the field of art that enzymes tend to be unstable in that their degree of activity can diminish over time. Therefore it is a further objective of the invention to utilize stabilizers to counteract this effect. Generally speaking, a stabilizer has the ability to help maintain the degree of activity of an enzyme over time without interfering in the catalytic reaction process. Stabilizers will typically, although not necessarily, be added to the ink at the same time that the enzymes are added. It is known in the art that stabilizers may be specific to particular enzymes, and effectiveness may be further influenced by concentration. For example, Bovine Serum Albumin (BSA) is a protein that is commonly used to stabilize enzymes; however, other agents such as, for example, certain sugars, salts (such as calcium salts), carboxylic acids and polyhydric alcohols may also be effective. Of course, the use of salts may be dependent on the type of ink application desired or the printhead utilized, so as to avoid corrosion of the printhead. Other examples of stabilizers may include surfactants within a certain concentration range and electrolytes. These stabilizers are presented merely as examples and are not meant to be exhaustive or limiting in any manner.

It is also recognized in the field of art that enzyme function is dependent upon pH. Enzymes usually have an optimum pH range in which they operate most effectively to catalyze a given reaction. Thus, it may be desirable to add pH buffers, such as sodium citrate, trisodium phosphate, disodium hydrogen phosphate, sodium dihydrogen phosphate, sodium or potassium acetates, acetic acid, citric acid, hydrochloric acid, sodium hydroxide, and the like to the ink.

It is also recognized in the field of ink art that inks may be subject to microbial growth over time. Therefore, it is a further objective of the invention to utilize preservatives to counteract this effect. Preservatives contemplated by the invention include biocides and biostats. Generally speaking, biocides kill microbes while biostats prevent microbes from multiplying. Examples of such preservatives that can be utilized with the invention include, but are not limited to, ethanol, isopropanol, benzoic acid, sodium nitrite, sodium nitrate, and ethylenediaminetetraacetic acid (EDTA) or the sodium salt thereof; eugenol, thymol, and eucalyptol, which are naturally occurring phenolic preservatives; and Proxel GXL (for basic formulations) and Proxel DB-20 (for acidic formulations), which are commercially available preservatives from Avecia Inc. of Wilmington, Del. Such preservatives are effective against bacterium, molds and yeasts. These preservatives are presented merely as examples and are not meant to be exhaustive or limiting in any manner.

The following exemplary formulas for ink-like vehicles and prophetic inks are presented to illustrate different aspects of the present invention. For the examples, percentages are percents by weight, unless otherwise noted.

EXAMPLE 1

An ink-like vehicle comprising the present invention was formulated in accordance with the components in the following Table 1(a) and detailed in the following description.

TABLE 1(a)

| Ink-like Vehicle | |
|---|---|
| COMPOUND | QUANTITY |
| Deionized water | 156.50 g |
| 2-pyrrolidone | 12.00 g |
| Tripropyl methyl glycol ether | 10.00 g |
| Polyethylene glycol 600 | 20.60 g |
| Proxel GXL (biocide) | 0.60 g |

The ink-like vehicle was formulated by combining 156.50 grams of deionized water, 12.00 grams of 2-pyrrolidone (available from Aldrich Chemical Co Inc. of Milwaukee, Wis.), 10.00 grams of tripropyl methyl glycol ether (available from Gallade Chemical Inc., of Santa Ana, Calif.), 20.60 grams of polyethylene glycol 600 (poly(ethylene glycol) with a molecular weight of approximately 600, available from Aldrich Chemical Co Inc. of Milwaukee, Wis.), and 0.60 grams of Proxel GXL biostat (available from Avecia Inc. of Wilmington, Del.).

An indicator solution for hydrogen peroxide was also formulated in accordance with the components in the following Tables 1(b) and 1(c) and detailed in the following description.

TABLE 1(b)

| Buffered 5 mM Glucose Solution | |
|---|---|
| COMPOUND | CONCENTRATION |
| Na$_2$HPO$_4$ | 50 mM |
| Citric Acid | 25 mM |
| Sodium Chloride | 50 mM |
| Glucose | 5 mM |

Disodium hydrogen phosphate (available from Sigma-Aldrich of Milwaukee, Wis.) was dissolved in deionized water. Citric acid and sodium chloride (both available from Sigma-Aldrich of Milwaukee, Wis.) were added to give the concentrations given in Table 1(b). This solution gave a pH of 5.00. The glucose solution was stored overnight at 4° C. to effect mutarotation of the glucose.

TABLE 1(c)

| Indicator Solution | |
|---|---|
| COMPOUND | QUANTITY |
| Buffered 5 mM glucose solution | 15 ml |
| Peroxidase enzyme (activity: 150–250 units per mg) | 1 mg |

TABLE 1(c)-continued

| Indicator Solution | |
|---|---|
| COMPOUND | QUANTITY |
| Agitate to dissolve enzyme | |
| 4-chloro-1-naphthol (4CN) solution | 1 ml |

The indicator solution for hydrogen peroxide was formulated by dissolving 1 milligram of peroxidase enzyme (Type 2, from horseradish, available from Sigma-Aldrich of Milwaukee, Wis.) into 15 milliliters of buffered 5mM glucose solution, Table 1(b). To this mixture, 1 milliliter of 4-chloro-1-naphthol peroxidase substrate solution (4CN) (available from Kirkegaard and Perry Labs. from Gaithersburg, Mass.) was added. Peroxidase enzyme facilitates oxidization of the 4CN substrate to a violet colored compound in the presence of hydrogen peroxide.

To demonstrate the invention, 0.6 milliliters of deionized water were mixed with 1.4 milliliters of the ink-like vehicle, and 0.4 milliliters of indicator solution was added. Under these conditions, no color developed, indicating that hydrogen peroxide was not present in the ink-like vehicle.

Subsequently, 1.4 milliliters of the ink-like vehicle was combined with 0.6 milliliters of 1 milligram/milliliter glucose oxidase solution (activity 166,000 units/mg, type X-S from *Aspirgillis Niger*, available from Sigma of St Louis, Mo.). When 0.4 milliliters of indicator solution was added, an immediate purple color developed, indicating that hydrogen peroxide was being produced by the glucose oxidase and converted to water by the peroxidase enzyme in the solution. This reaction is summarized in FIG. 3. In addition, the purple color indicated that the peroxidase enzyme was also operating in the solution. Moreover, it indicated that dissolved oxygen was being converted into hydrogen peroxide, and then into water in situ.

EXAMPLE 2

The present invention is further illustrated by the prophetic example formulated in accordance with the components in the following Table 2 and detailed in the following description. Percentages are percent by weight.

TABLE 2

| COMPOUND | QUANTITY |
|---|---|
| Ink-like vehicle (As previously described) | 81.9% |
| Surfactants | 2% |
| Pigment dispersion | 15% |
| Glucose oxidase | 0.05% |
| Glucose | 0.5% |
| Peroxidase | 0.05% |
| Sodium Ascorbate | 0.5% |

Upon exposure to oxygen, the glucose oxidase solution would catalyze a reaction between the oxygen and the glucose to form hydrogen peroxide, and the peroxidase solution would subsequently catalyze a reaction between the hydrogen peroxide and the sodium ascorbate to produce water. In this example, ascorbate would be substituted for 4-Chloro-1-Naphthol as a peroxidase donor substrate so that the oxidation would produce a colorless product. Essentially, when used together, the two enzymes have the ability to take dissolved oxygen and convert it to water, a commonly used solvent in an ink jet ink.

It should be recognized that in most practical applications of the method of producing ink, method of printing ink, and ink produced using the inventive methods, a colorless reaction product is desired.

It should be appreciated that the solubility of gases in water varies, but is outlined in J. G. Stark and H. G. Wallace, "Chemistry Data Book", $2^{nd}$ Edition, Publ. John Murray, London, (1991), p.60. Generally speaking, the absorption coefficient equals the unit volumes of gas that will dissolve in a unit volume of water at 0° C. at 1 atmospheric pressure (101325 $N.m^{-2}$.) Such is reflected in the following Table 3.

TABLE 3

| GAS | ABSORPTION COEFFICIENT AT 0° C. |
|---|---|
| Oxygen | 0.049 |
| Nitrogen | 0.024 |

Thus, oxygen is twice as soluble in water as nitrogen and therefore, may present a greater problem from a runability perspective.

Additional prophetic examples are described in the following Tables 4–6 which illustrate various colored ink formulations.

TABLE 4

| COMPOUND | AMOUNT |
|---|---|
| Water | 75.4% |
| Bioban DXN (50%) | 0.4% |
| Cobratec 99 | 0.1% |
| Butylcarbitol | 12% |
| Tetrasodium ethylenediamine tetraacetic acid | 0.2% |
| 2-pyrrolidone | 6% |
| Tris buffer | 0.4% |
| Triethanolamine (85%) | 0.4% |
| Isopropanol | 2% |
| Glucose | 0.5% |
| Sodium ascorbate | 0.5% |
| Cl Direct Blue 199 | 2% |
| (Degass step) | |
| peroxidase | 0.05% |
| Glucose oxidase | 0.05% |

The Tris Buffer is available from Aldrich (99+% Catalog #T87602), the Butyl Carbitol is available from Union Carbide, the Triethanolamine (85%) is available from Union Carbide Chemicals and Plastics Co. Inc., of Danbury Conn, the Bioban DXN (biocide or biostat) is available from Angus Chemical Corp. of Wilmington Del., the Cobratec 99 (corrosion inhibitor) is available from PMC Specialty Group Distributing of Cincinnati, Ohio, the CI Direct Blue 199 dye is available from Aldrich, and the remaining materials are likewise available from Aldrich.

TABLE 5

| COMPOUND | AMOUNT |
|---|---|
| Water | 81.0% |
| Bioban DXN | 0.4% |
| Cobratec 99 | 0.1% |
| PEG 600 | 6% |
| 2-pyrrolidone | 6% |
| Triethanolamine (85%) | 0.4% |
| Isopropanol | 2% |

TABLE 5-continued

| COMPOUND | AMOUNT |
|---|---|
| Glucose | 0.5% |
| Sodium ascorbate | 0.5% |
| Cl Acid Blue 9 | 3% |
| (Degass step) | |
| peroxidase | 0.05% |
| Glucose oxidase | 0.05% |

The CI Acid Blue 9 dye is available from Aldrich.

TABLE 6

| COMPOUND | AMOUNT |
|---|---|
| Water | 72.4% |
| Bioban DXN | 0.4% |
| Cobratec 99 | 0.1% |
| Butylcarbitol | 12% |
| Tetrasodium ethylenediamine tetraacetic acid | 0.2% |
| 2-pyrrolidone | 6% |
| Tris buffer | 0.4% |
| Triethanolamine (85%) | 0.4% |
| Isopropanol | 2% |
| Glucose | 0.5% |
| Sodium ascorbate | 0.5% |
| Aqueous Cl Pigment Yellow 17 dispersion | 5% |
| (Degass step) | |
| peroxidase | 0.05% |
| glucose oxidase | 0.05% |

The aqueous CI Pigment Yellow 17 dispersion is available in finely dispersed forms of ink jet quality from Sun Chemical Corp., of Cincinnati Ohio.

It should be appreciated that for each of the examples described above, the various components are added to the mixture in the order presented. The degassing step noted in some of the examples is accomplished so as to initially remove any unwanted gasses from the mixture. The remaining ink is then exposed to the reactions of the enzymes to remove gasses from the ink while in storage or during use in an ink jet printer. Ideally, such inks are packaged in an environment that would prevent the entry of unwanted gasses into the ink system. Alternatively, the enzymes and/or the donor substrates may be added to an ink prior to actual use in an ink jet printer. It should be appreciated that the method of degassing inks may therefore be used to promote shelf life (if the ink includes the enzyme component(s) during storage prior to use) or to address runability/printability problems (if the ink includes the enzyme component(s) prior to the cartridge being loaded in an ink jet printer). The enzymatic reactions then continue as long as gasses are present.

Although various embodiments of the invention have been described using specific terms, devices, and methods, such description is for illustrative purposes only. The words are words of description rather than of limitation. It is to be understood that changes and variations may be made by those of ordinary skill in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the exemplary versions contained therein.

We claim:

1. A method for degassing ink comprising the addition of at least one enzyme to ink containing a donor substrate, said enzyme capable of catalyzing the production of a reaction product that is acceptable to an ink formulation, by using a donor substrate contained in the ink upon exposure to a gaseous acceptor substrate.

2. A method for degassing ink comprising the addition of at least two enzymes to ink containing a donor substrate specific to each enzyme, wherein one of the enzymes catalyzes a chemical reaction to produce a first reaction product upon exposure to a gaseous acceptor substrate, and another enzyme subsequently catalyzes a reaction to convert the first reaction product into a second reaction product that is acceptable in an ink system.

3. A method for degassing ink comprising the addition of at least two enzymes to ink containing a donor substrate specific to each enzyme, wherein one of the enzymes catalyzes a chemical reaction to produce hydrogen peroxide upon exposure to an acceptor substrate, and another enzyme subsequently catalyzes a reaction to convert the hydrogen peroxide into water.

4. The method of claim 3 wherein the ink is used for inkjet printing.

5. The method of claim 3 wherein the ink is aqueous.

6. The method of claim 3 wherein one enzyme is selected from the oxidase enzyme class.

7. The method of claim 6 wherein the enzyme selected from the oxidase enzyme class is selected from the group consisting of glucose oxidase and galactose oxidase.

8. The method of claim 3 wherein one enzyme is selected from the peroxidase enzyme class.

9. The method of claim 3 wherein one donor substrate is at least either glucose or galactose.

10. The method of claim 3 wherein one donor substrate is at least an alkali metal ascorbate or ascorbic acid.

11. The method of claim 3 wherein one acceptor substrate comprises at least oxygen.

12. The method of claim 1 wherein one acceptor substrate comprises gases present in air.

13. The method of claim 1 wherein said at least one enzyme can catalyze a reaction to convert nitrogen into either ammonia or ammonium.

14. The method of claim 3 further including the step of incorporating a stabilizer to said ink.

15. The method of claim 3 further including the step of incorporating a preservative to said ink.

16. A method for degassing ink comprising the addition of at least two donor substrates, at least two enzymes, and at least one acceptor substrate to an aqueous inkjet ink, wherein each donor substrate is specific to each enzyme, and further wherein said at least one acceptor substrate comprises oxygen, and wherein one enzyme catalyzes a chemical reaction to produce hydrogen peroxide upon exposure to oxygen, and another enzyme subsequently catalyzes a reaction to convert the hydrogen peroxide into water.

17. The method of claim 16 wherein the enzymes are at least an oxidase and a peroxidase.

18. The method of claim 16 wherein one donor substrate is at least glucose or galactose.

19. The method of claim 16 wherein one donor substrate is at least ascorbic acid or a salt thereof.

20. The method of claim 16 wherein one acceptor substrate comprises at least oxygen.

21. The method of claim 16 wherein one acceptor substrate comprises air.

22. The method of claim 16 further including the step of incorporating a stabilizer into said ink.

23. The method of claim 16 further including the step of incorporating a preservative into said ink.

24. An ink degassed by the method of claim 1.

25. An ink degassed the method of claim 2.

26. An ink degassed by the method of claim 3.

27. An ink degassed by the method of claim 16.

28. An ink composition comprising at least one enzyme, and a donor substrate specific to said enzyme, said enzyme capable of catalyzing the production of a reaction product that is acceptable to said ink formulation, by using said donor substrate contained in the ink upon exposure to a gaseous acceptor substrate.

29. An ink composition comprising at least two enzymes and donor substrates specific to each enzyme, wherein one of the enzymes is capable of catalyzing a chemical reaction to produce a first reaction product upon exposure to a gaseous acceptor substrate, and another enzyme is capable of subsequently catalyzing a reaction to convert the first reaction product into a second reaction product that is acceptable to said ink.

30. An ink composition comprising at least two enzymes and donor substrates specific to each enzyme, wherein one of the enzymes is capable of catalyzing a chemical reaction to produce hydrogen peroxide upon exposure to a gaseous acceptor substrate, and another enzyme is capable of subsequently catalyzing a reaction to convert the hydrogen peroxide into water.

31. The ink composition of claim 30 further comprising a stabilizer.

32. The ink composition of claim 30 further comprising a preservative.

33. A method of printing comprising printing the composition of claim 30 through an ink jet printer.

* * * * *